United States Patent [19]

Losenno et al.

[11] Patent Number: 5,623,974
[45] Date of Patent: Apr. 29, 1997

[54] SPRAY PRODUCT AND PUMP TO SUPPLY AIR UNDER PRESSURE TO THE DISPENSER

[76] Inventors: Christopher D. Losenno; Gino L. Losenno, both of 5733 Beard Ave. S., Edina, Minn. 55410

[21] Appl. No.: 327,705

[22] Filed: Oct. 24, 1994

[51] Int. Cl.$^6$ .................. B65B 1/04; B65B 3/04; B65B 31/00; B67C 3/00
[52] U.S. Cl. .................. 141/20; 141/2; 141/3; 141/18; 141/113; 137/511; 137/853; 222/401; 222/402.1; 222/402; 222/402.16; 239/567; 239/297; 239/296; 417/415; 417/550
[58] Field of Search .................. 141/2, 3, 18, 20, 141/67, 113; 222/401, 402, 402.1, 402.16, 321.1; 417/415, 550, 551; 239/567, 296, 297, 301, 337; 137/511, 853

[56] References Cited

U.S. PATENT DOCUMENTS

| | | | |
|---|---|---|---|
| 2,506,751 | 5/1950 | Trask | 417/550 |
| 2,622,792 | 12/1952 | Ramclow | 417/550 |
| 3,122,324 | 2/1964 | Lee | 239/318 |
| 3,559,701 | 2/1971 | Wittersheim et al. | 141/20 |
| 3,592,244 | 7/1971 | Chamberlin | 141/20 |
| 3,718,165 | 2/1973 | Grothoff | 141/20 |
| 3,780,943 | 12/1973 | Lilja | 239/8 |
| 4,093,123 | 6/1978 | Maran | 239/322 |
| 4,108,219 | 8/1978 | Shulsinger | 141/3 |
| 4,154,271 | 5/1979 | Saeki | 141/20 |
| 4,285,372 | 8/1981 | Kieber | 141/2 |
| 4,532,685 | 8/1985 | Itoh et al. | 417/550 |
| 4,606,477 | 8/1986 | Spengler et al. | 222/153 |
| 4,921,020 | 5/1990 | Pamper | 141/20 |
| 4,941,615 | 7/1990 | Bolduc | 222/82 |
| 4,979,638 | 12/1990 | Bolduc | 222/1 |
| 5,179,982 | 1/1993 | Berube et al. | 141/20 |
| 5,343,904 | 9/1994 | Kaeser | 141/20 |
| 5,388,620 | 2/1995 | Lasserre et al. | 141/3 |
| 5,431,312 | 7/1995 | Schamacher | 222/401 |

*Primary Examiner*—Henry J. Recla
*Assistant Examiner*—Timothy L. Maust

[57] ABSTRACT

A dispenser having a manually-operated dispensing valve assembly has a container for accommodating a spray product. The bottom of the container has a recess adapted to cooperate with a tube used to deliver air under pressure from an air pump into the container. The container includes a check valve which allows air to flow into the chamber of the container and prevent the flow of air out of the chamber of the container. When the container is placed on the air pump, it actuates a switch which energizes an electric motor which drives a pump for supplying air under pressure which is directed to the tube and into the chamber of the container past the check valve.

35 Claims, 10 Drawing Sheets

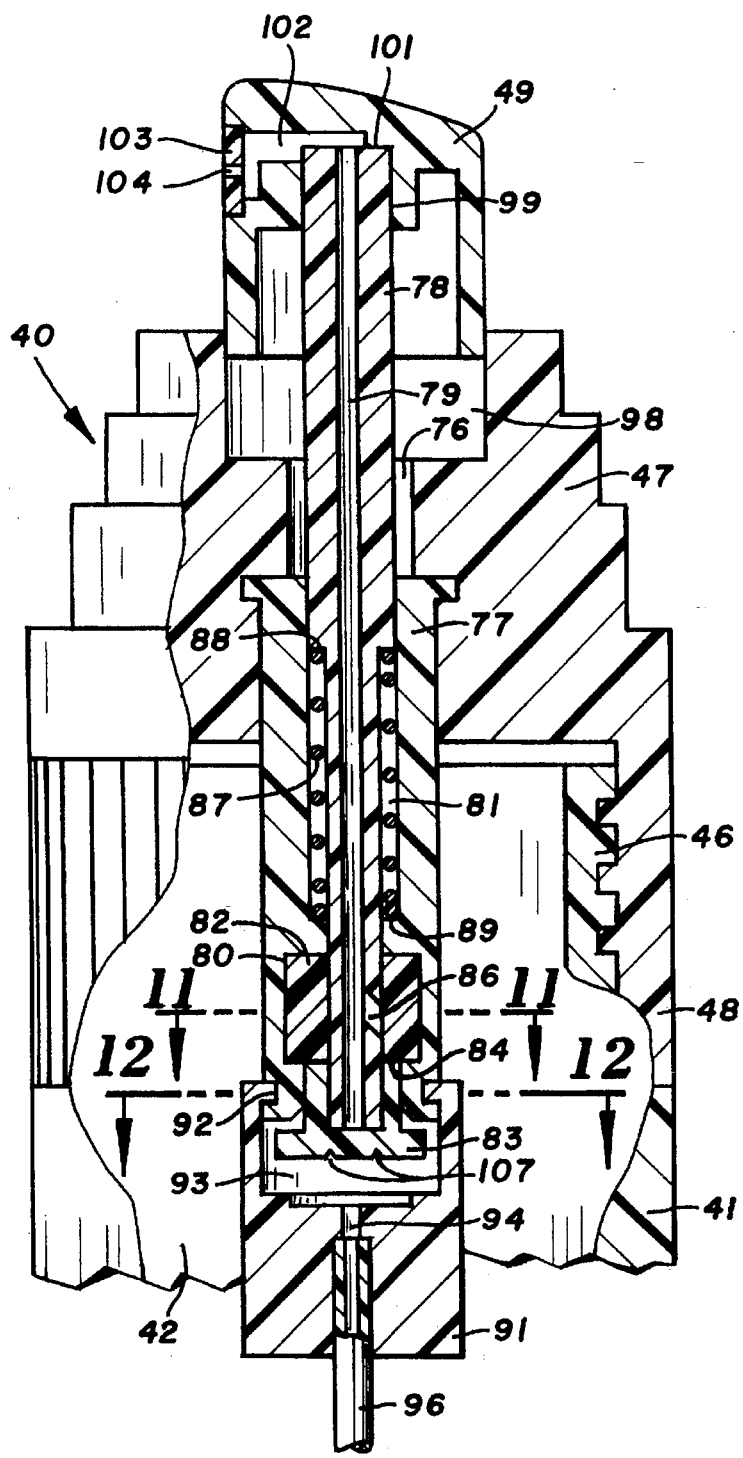
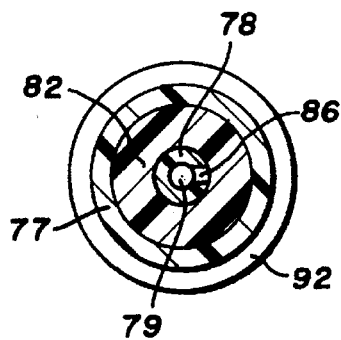
FIG.11
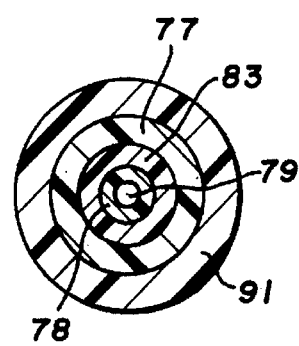
FIG.12
FIG.10

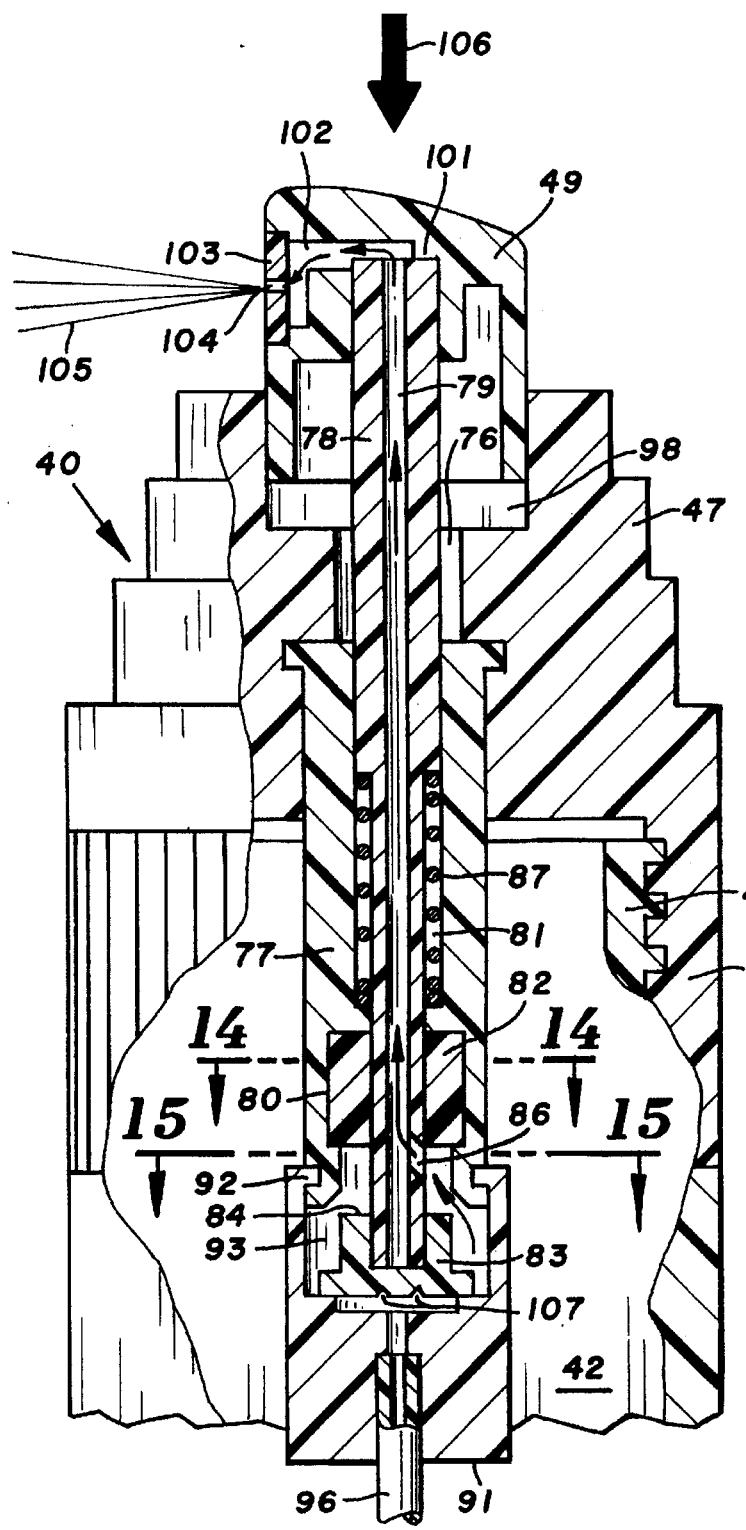
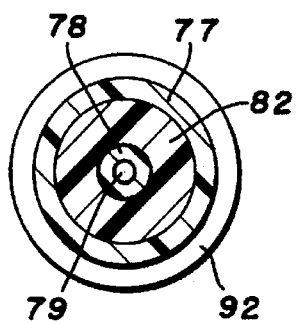
FIG.14
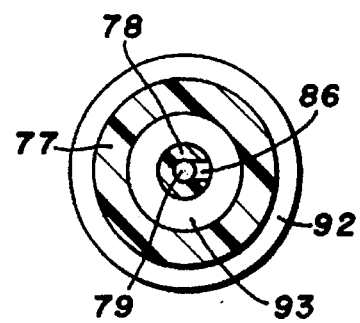
FIG.15
FIG.13

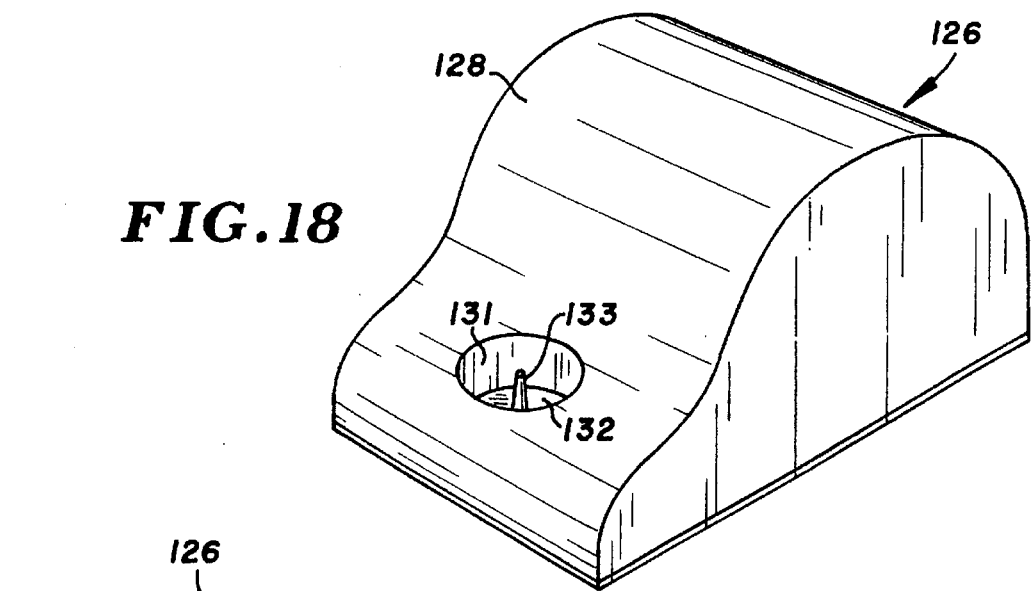
FIG. 18
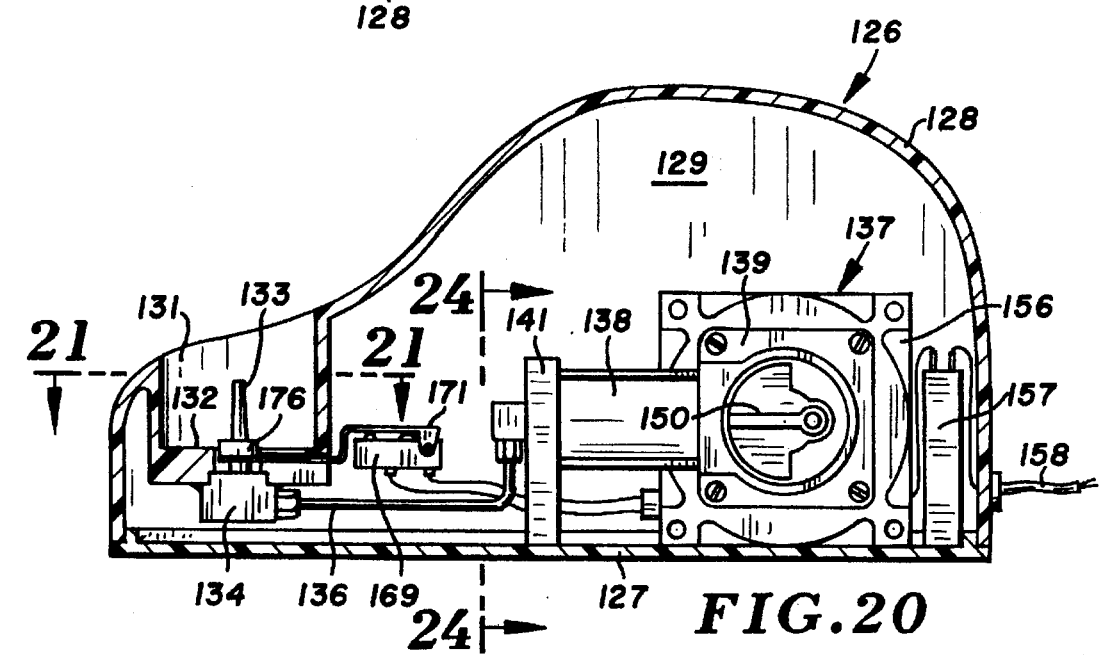
FIG. 19
FIG. 20

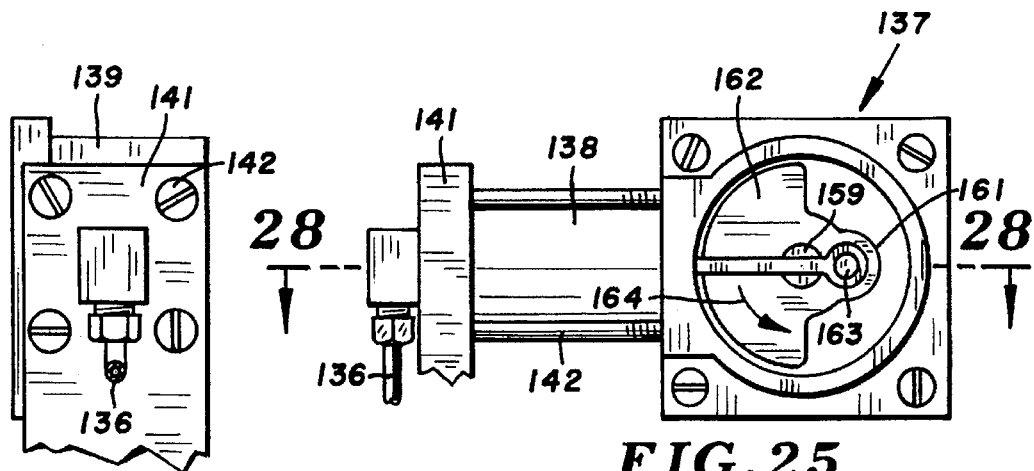
FIG.24  FIG.25
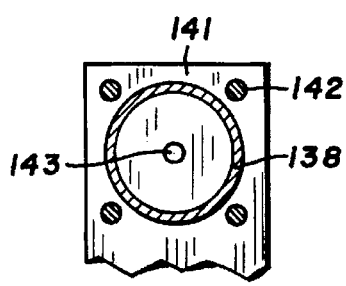
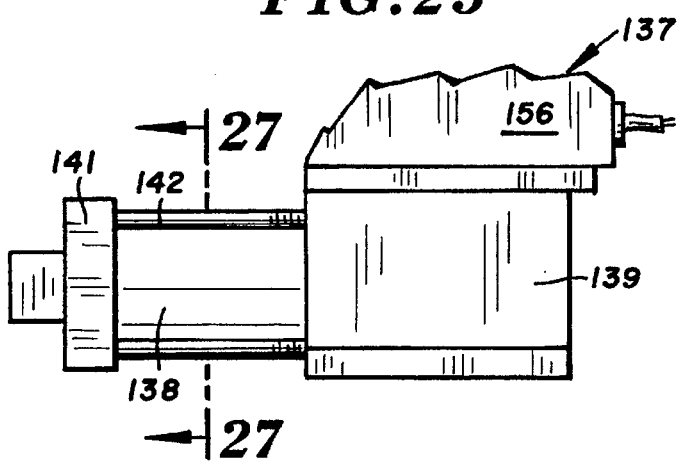
FIG.27  FIG.26
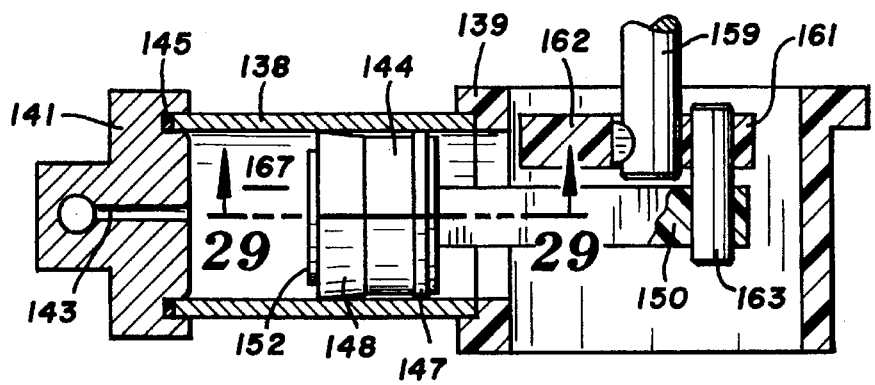
FIG.28

SPRAY PRODUCT AND PUMP TO SUPPLY AIR UNDER PRESSURE TO THE DISPENSER

FIELD OF THE INVENTION

The invention relates to the field of spray systems for dispensing spray products to a selected location. The spray system finds application in beauty salons where hair setting, conditioning and holding liquids and gels are used.

BACKGROUND OF THE INVENTION

Aerosol dispensers are in common use to dispense hair setting liquids, hair holding liquids, gels and mousses. Aerosol containers are not economically feasible in beauty salons where hair setting liquids and hair holding liquids are in general use. Aerosol containers, when empty, cannot be reused. They must be discarded which adds to environmental waste. Aerosol containers store propellants and chemical liquids under pressure. The propellants may include chlorofluorocarbons and volatile organic compounds that have adverse environmental effects. An example of an aerosol dispenser is shown in U.S. Pat. No. 4,893,730.

Portable pressure sprayers having self-contained pressurizing pumps are used to subject the container to air under pressure which pressurizes liquid contained in the container. These sprayers have piston pumps mounted on the cap closing the container. The valve and valve actuator structure that controls the flow of liquid to a nozzle is also mounted on the cap. An example of a portable pressure sprayer is shown in U.S. Pat. No. 4,606,477.

Spray apparatus which dispenses the fine and uniform particulate spray have been developed for use in beauty salons. This apparatus has a hand-operated spray gun connected with tubes to a container accommodating the liquid to be dispensed and an air pump which delivers air under pressure to the spray gun. This spray system does not have the convenience of a self-contained spray can, as it requires a liquid line and an air line leading to the spray gun. An example of this spray apparatus is disclosed in U.S. Pat. No. 3,780,943.

SUMMARY OF THE INVENTION

The invention is a spray system for generating fine and uniform liquid particles of a spray product, and directing the particles to a desired location. A broad spectrum of applications, including hair and personal care products, pharmaceutical, automotive and household products, are adaptable to the spray system of the invention. The spray system is adaptable to beauty salons wherein hair setting and styling liquids, gels and mousses can be applied to the hair of a person. The spray system does not use pressurized chemical propellants, as pressure on the liquid in the system is established with air pressure which does not have any adverse environmental effects and can be safely used in a beauty salon and other environments.

The spray system has a dispenser for holding a spray product and an air pump for supplying air under pressure to the chamber of the dispenser that accommodates the spray product. The dispenser is a self-contained container having an air inlet that includes a check valve to allow air to flow into the chamber and block the flow of air out of the chamber. The container has a cap which can be removed to allow additional spray product to be placed in the dispenser. The dispenser is a reusable container having a relatively long use life. A valve assembly mounted on the container is operable to selectively allow the spray product to be dispensed as a particulate stream of product to a selected location and prevent the dispensing of the product. The air pump has a pump operable to supply air under pressure and structure for receiving air from the air pump cooperating with the air inlet of the container for opening the check valve and directing air under pressure into the chamber of the container thereby subjecting the spray product to pressurized air.

The bottom wall of the container has a recess open to a passage leading to the check valve. The air pump includes a tube extendable into the recess for delivering air under pressure to the passage whereby air flows to the chamber of the container. The recess has cone-shaped side walls which accommodate the convergingly-tapered upwardly-directed tube to provide an air seal between the side walls and the tube.

The air pump is driven by an electric motor controlled with a switch operable to connect the motor to a source of electric power. The switch has an actuator which is operable to turn the switch ON to connect the electric motor with a source of electric power when the tube and container are coupled together so that air generated by the pump can open the check valve and flow into the chamber of the container. The air pump is enclosed within a housing having a recess for accommodating the bottom portion of the container. The tube extends upwardly into the recess so that when the container is placed in the recess, the tube cooperates with the container to provide an air flow connection so that air pressure generated by the pump will open the check valve and flow into the chamber of the container.

The air pump has a cylinder having a chamber and a piston reciprocating in said chamber to compress air. The electric motor is linked to the piston to move the piston relative to the cylinder. A flap valve mounted on the piston is operable to allow air to flow through at least one hole in the head of the piston into the cylinder chamber and prevent air from flowing through the hole out of the chamber. The flap valve is a one way valve that is mounted on the piston and is operable in response to the reciprocating movement of the piston.

The valve assembly includes a sleeve mounted on the cap closing the container. A tubular member having a lower end, an upper end, and a passage with a side port open to the passage for carrying spray product to a nozzle is movably mounted on the sleeve for movement to a first position to allow the spray product to flow through the passage and side port to a second position to prevent the spray product from flowing through the passage and side port. A collar, mounted on the sleeve, is engageable with the tubular member. The side port is closed by the collar when the tubular member is in the second position and open when the tubular member is in the first position to allow the spray product to flow through the side port passage and tubular member leading to the nozzle. The nozzle has at least one small orifice through which the liquid under pressure is forced into the atmosphere. The liquid discharged from the nozzle is broken up into fine particles or a mist which is directed to a selected location, such as the hair of a person. A biasing spring, separated from the passage carrying the spray product, is located between the sleeve and tubular member and functions to bias the tubular member to the first or closed position. The spring being isolated from the spray product does not alter the formulation of the spray product nor cause malfunction of the spring. The spray product can be low alcohol formulations and alcohol free formulations since the spray product does not effect the biasing operation of the spring.

The dispenser is a portable unit that is uncoupled from the air pump during the dispensing of the spray product. The operator is free to move to any desired location relative to a person and can quickly and accurately apply a spray product to the person's hair. The cap on the container is removable so that the dispenser can be recharged with additional spray product and recharged with a supply of air under pressure.

The objects and advantages of the spray system, including the dispenser and air pump of the invention, are embodied in the dispenser, air pump structure and functions shown in the drawing and described in the specification of the preferred embodiment thereof.

DESCRIPTION OF DRAWINGS

FIG. 10 is an enlarged vertical sectional view of the spray product discharge valve assembly in the upper portion of the dispenser;

FIG. 11 is an enlarged sectional view taken along the line 11—11 of FIG. 10 showing the valve in the closed position;

FIG. 12 is a sectional view taken along the line 12—12 of FIG. 10;

FIG. 13 is a sectional view similar to FIG. 10 showing the spray product discharge valve assembly in the open position;

FIG. 14 is a sectional view taken along the line 14—14 of FIG. 13;

FIG. 15 is a sectional view taken along the line 15—15 of FIG. 13;

FIG. 18 is a perspective view of an air pump operable to supply the dispenser with pressurized air;

FIG. 19 is a top plan view of FIG. 18;

FIG. 20 is an enlarged sectional view taken along the line 20—20 of FIG. 19;

FIG. 24 is an enlarged sectional view taken along the line 24—24 of FIG. 20;

FIG. 25 is a side elevational view of the piston and cylinder assembly of the air pump;

FIG. 26 is a top plan view of the piston and cylinder assembly and electric motor attached thereto;

FIG. 27 is a sectional view taken along the line 27—27 of FIG. 26;

FIG. 28 is an enlarged sectional view taken along the line 28—28 of FIG. 25;

DESCRIPTION OF THE PREFERRED EMBODIMENT

Figure 1:
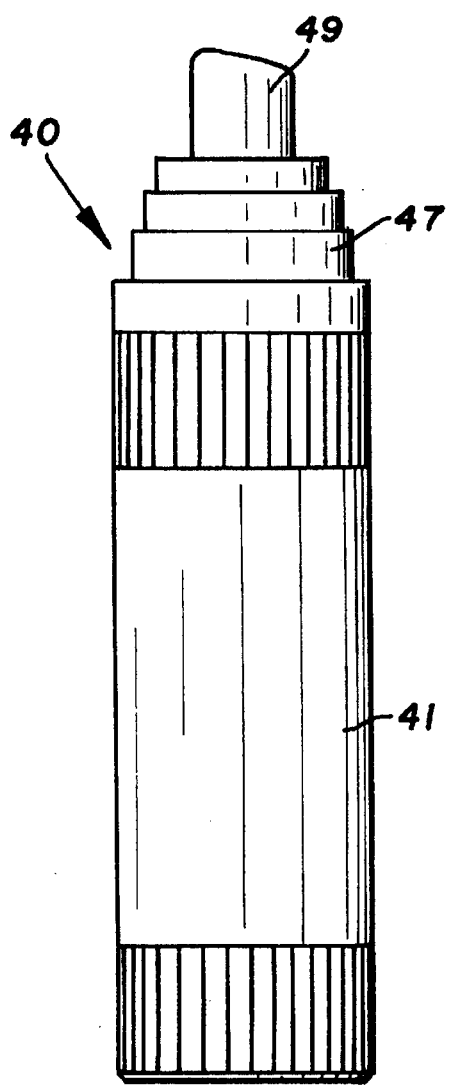
FIG. 1 is a side elevational view of the spray product dispenser of the invention.
Figure 2:
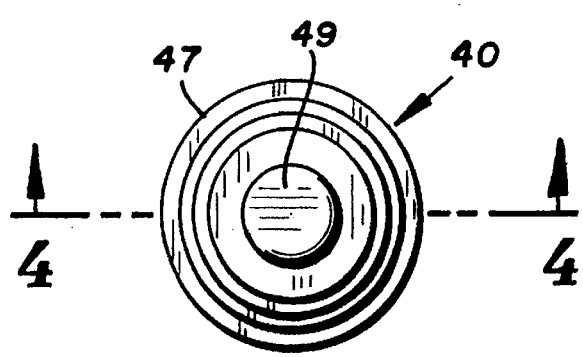
FIG. 2 is a top plan view of the dispenser of FIG. 1.
Figure 3:
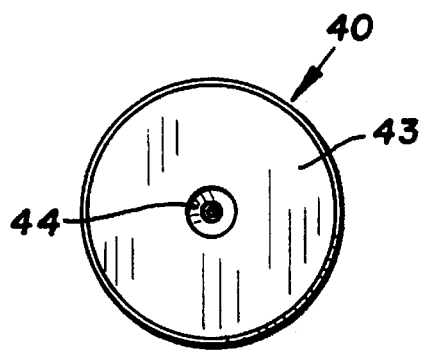
FIG. 3 is a bottom plan view of the dispenser of FIG. 1.
Figure 4:
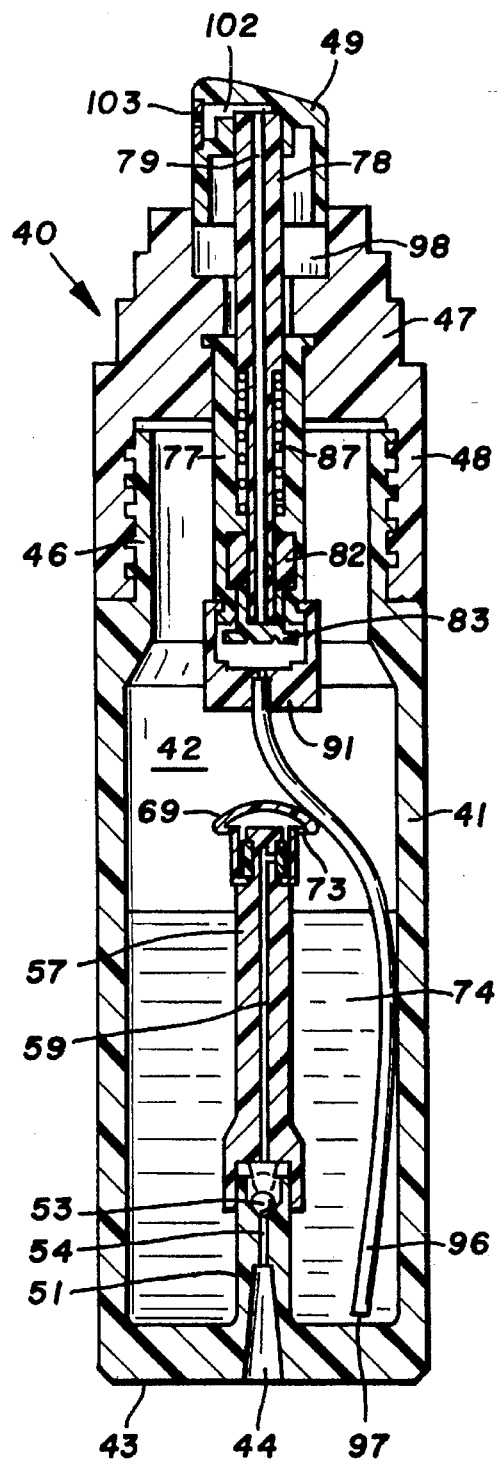
FIG. 4 is an enlarged sectional view taken along the line 4—4 of FIG. 2 showing the dispensing valve closed.

Referring to the drawings, there is shown in FIGS. 1–5 the dispenser of the invention, indicated generally at 40, operable to dispense a spray product to a selected location. The spray product is flowable material that can be dispensed through a nozzle which breaks up the material into particles and directs the particles to a selected location. The spray product includes liquids, gels, semi-solid materials and mixtures of liquids and semi-solid materials. The spray product hereinafter described is a liquid, such as hair setting, conditioning and holding liquids and gels. The spray products include permanent wave hair liquids. Other types of liquids, gels and mousses can be used with the spray system of the invention. An example of a hair spray product includes the following materials: SD Alcohol, Dimethyl Ether, Water VA/Crontonates, Vinyl Neodecanoate Copolymer, Can Frey Leaves, Oat Extract, Althea Extract, Orange Flower, Burate Extract, Chamomile Extract, Aloe Vera Gel, Propylene Glycol, Glycerin, Sodium PCA, Sodium Benzoate, Cyclohexylamine, Dimethicone, Copolyol, Aminomethyl, Propanol and Fragrance.

The following material is useable to provide hairstyles without structural failure: SD Alcohol, Deionized Water, PVP/VA Copolymer, Polyquanternium-11, Dimethicone Copolyol, Benophenone-4, Glycerin, Panthenol, Tocopheryl Acetate, Propylene Glycol and Fragrance. The spray product can be low alcohol formulations as well as alcohol free formulations which has low volatile organic compounds.

Dispenser 40 is used in beauty salons where hair setting, conditioning and holding liquids and gels are in general use by beauty operators. Dispenser 40 has a cylindrical container body 41 having an internal chamber 42 for accommodating the spray product, such as a liquid, and air. Body 41 has a bottom wall 43 with a central recess 44 for accommodating a tapered tubular member 133 for directing air under pressure into chamber 42, as herein described. The upper end of body 41 has an external threaded neck 46. A cap 47, having a cylindrical flange or skirt 48 with internal threads is threaded onto the threaded neck 46 to close chamber 42. Body 41 and cap 47 are rigid plastic members. The top of cap 47 has a downwardly movable dispensing actuator or button 49 which is manually operated to dispense the liquid as a fine spray from dispenser 40 to a selected location.

Figure 6:
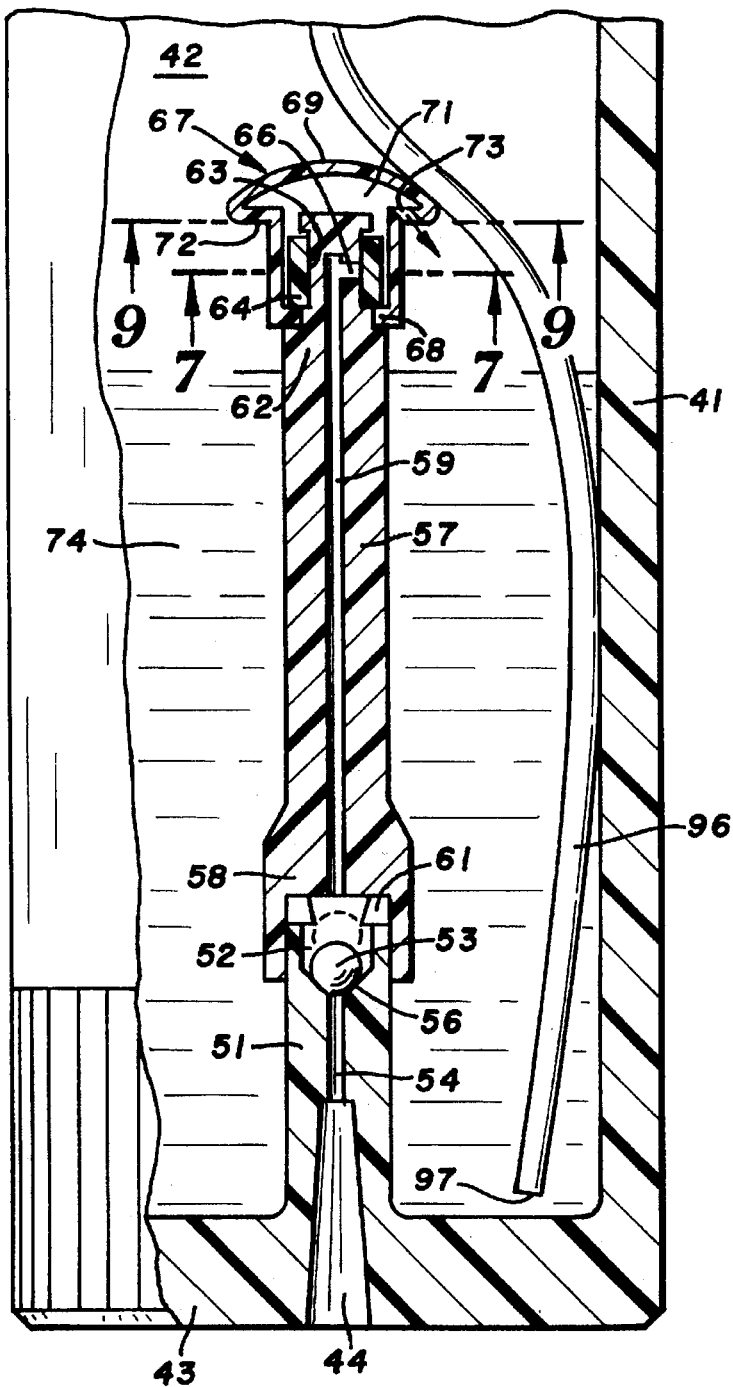
FIG. 6 is an enlarged vertical sectional view of the air input assembly in the lower portion of the dispenser.
Figure 7:
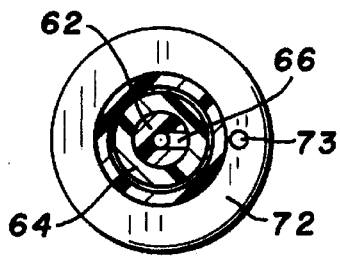
FIG. 7 is a sectional view taken along the line 7—7 of FIG. 6.

As seen in FIG. 6, bottom wall 43 has an upwardly directed projection or member 51 having a top pocket 52 accommodating a ball or check valve 53. A passage 54 connects pocket 52 with recess 44. Ball 53, when in the closed position, rests on an annular inclined seat 56 to close passage 54. The air under pressure in chamber 42 holds check ball 53 in the closed position. An upright pipe or tubular member 57 extends upwardly from member 51. Tubular member 57 has a lower end 58 telescoped over the top of member 51 and secured thereto. Tubular member 57 has an upwardly directed passage 59 that is open to pocket 52 and a lateral passage 66. Downwardly directed fingers 61 joined to tubular member 57 project downwardly into pocket 52 and serve as stops to limit the upward or open position of ball 53, as shown in dotted lines. When ball 53 is in the raised or open position, the air under pressure can flow through pocket 52 and passages 59 and 66 into chamber 42.

Tubular member 57 has an upper end 62 having an outwardly open annular groove 63 accommodating a flexible and resilient collar 64. Collar 64 can be made of a flexible plastic. The upper end 62 of tubular member 57 has lateral or spur passage 66 connecting passage 59 to groove 63 accommodating annular collar 64 whereby air under pressure flow past collar 64 on its way into chamber 42.

Figure 8:
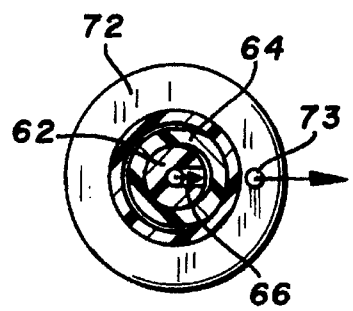
FIG. 8 is a sectional view similar to FIG. 7 showing the flow of air through the air input assembly.
Figure 9:
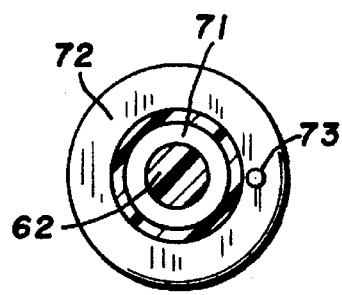
FIG. 9 is a sectional view taken along the line 9—9 of FIG. 6.

A dome-shaped cap, indicated generally at 67, is mounted on the upper end of tubular member 57. Cap 67 has a lower annular lip 68 that fits under collar 64 in the lower end of groove 63. Cap 67 also has a convex-shaped top wall 69 covering a chamber 71. The outer peripheral edge of top wall 69 is joined to an inwardly directed bottom wall 72. As seen in FIG. 8, bottom wall 72 has a single passage or hole 73 for directing air under pressure into chamber 42 with a minimum of interference with and mixing the air with the liquid to avoid generation of foam in chamber 42.

Referring to FIG. 10, cap 47 has a longitudinal upright bore 76 accommodating a sleeve 77. Sleeve 77 is fixed to cap 47 and extends downwardly into chamber 42. The upper end of sleeve 77 has an outwardly-directed annular flange that fits into an annular groove in cap 47 to retain sleeve 77 in assembled relation with cap 47. Other connecting structures, including threads, can be used to secure sleeve 77 to cap 47. An elongated tubular member or valve actuator 78 is interposed in bore 76 and extends through a passage 81 in tubular member 78. Tubular member 78 has a central passage 79 leading from the lower end to the upper end thereof. An annular ring or sleeve 82, located in an annular recess in the lower end of sleeve 77, surrounds tubular member 78. Tubular member 78 has an inclined hole 86 that is closed with ring 82. A cup-shaped member 83 is mounted on the lower end of tubular member 78 closing the bottom of passage 79. Cup-shaped member 83 has an annular upper surface 84 located in surface engagement with the bottom of ring 82 to provide an annular seal between cup-shaped member 83 and ring 82. A spring 87, located about the mid portion of tubular member 78, engages a top shoulder 88 on tubular member 78 and a bottom shoulder 89 on sleeve 77 to bias tubular member 78 in an upward direction thereby holding the cup-shaped member 83 in sealing engagement with the bottom of ring 82. Spring 87 is separated from ring 82 with shoulder 89 and is located in a separate annular space 81 about tubular member 78 isolated from liquid 74 in chamber 42 and the liquid flowing through passage 79. The spray product in chamber 42 and passage 78 does not contact spring 87. The spray product cannot collect on spring 87 or build up in the annular space accommodating spring 87 so that the spray product does not interfere with the biasing function of spring 87. There is no chemical reaction between the spray product and spring 87 which may alter the formulation of the spray product.

A connector or body 91 has an inwardly directed annular rib or flange 92 connected to the lower end of sleeve 77. Annular flange 92 snaps into an annular groove in the lower end of sleeve 77 to firmly attach body 91 to sleeve 77. Body 91 has a chamber 93 accommodating a lower portion of cup-shaped member 83 to allow member 83 to move up to a closed position, as seen in FIG. 10, and down to an open position, as seen in FIG. 11. A passage 94, open to the bottom of chamber 93 and the bottom of body 91 communicates with a long flexible tube 96 that leads to the bottom of chamber 42. Tube 96 has an open lower end 97 and an internal passage for carrying fluid from the bottom of chamber 42 into chamber 93. The upper end of tube 96 fits into the lower end of passage 94 and is secured to body 91. Passage 94 can have a smaller diameter which accommodates a tube having a small passage for carrying liquids. Tube 96 has a large passage for carrying gel-like liquids and low alcohol spray products.

Figure 5:
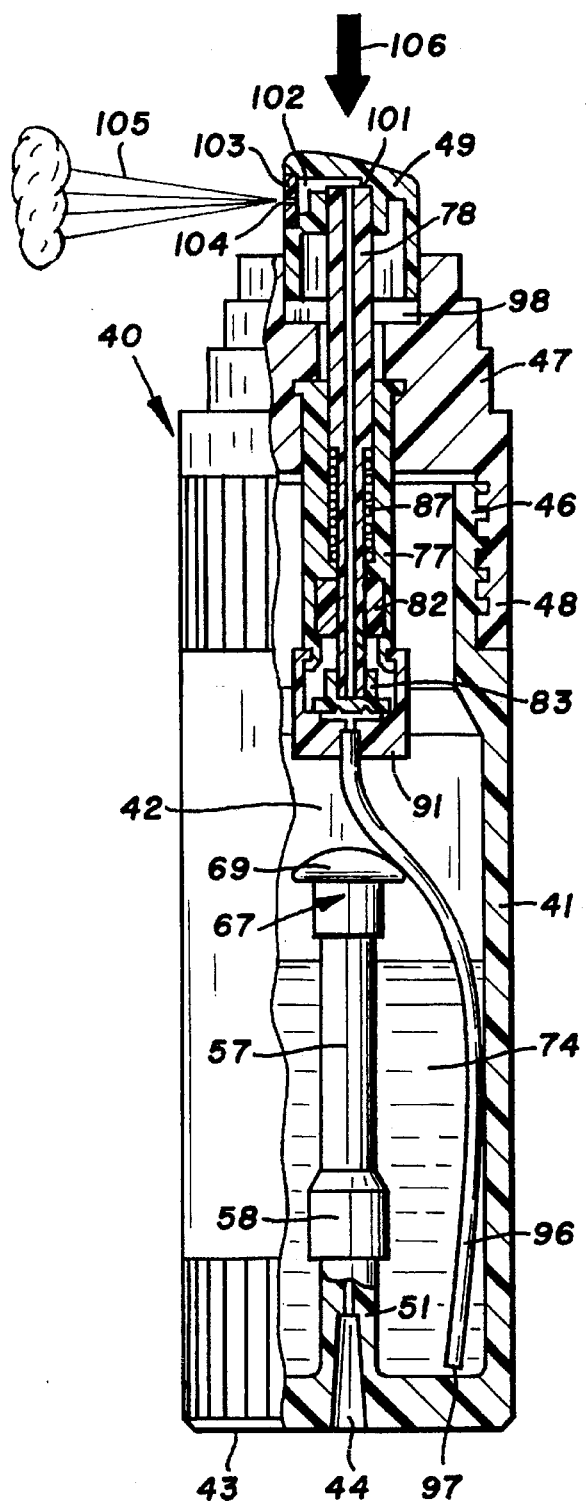
FIG. 5 is a sectional view similar to FIG. 4 showing the dispensing valve open.

The upper end of cap 47 has a recess 98 accommodating actuator or button 49. The inside of button 49 has an annular bore 99 accommodating the upper end of tubular member 78 and a lateral passage 102 open to the upper end of passage 79. The top of tubular member 78 engages a shoulder 101 on button 49 to permit passage 79 to be open to lateral passage 102 leading to a disc 103. Disc 103 has a small opening or orifice 104 for providing a flow restricter for the liquid particles dispensed from button 49. The liquid particles are broken up into fine particles and direct streams of particles 105, as seen in FIG. 5, to a selected location.

Referring to FIGS. 13, 14 and 15, button 49 has been pushed to the down open position with force of a finger, indicated by arrow 106. Tubular member 78 moves cup-shaped member 83 to a down position out of engagement with ring 82. Lateral opening 86 in tubular member 78 is moved below ring 82 and is open to chamber 93. The bottom of cup-shaped member 83 has a plurality of slots 107 that allow the liquid under pressure in tube 96 to flow into chamber 93. The liquid flows through chamber 93 into lateral opening 86 and passage 89 to the lateral passage and button 79. The liquid being under air pressure is between 50–120 psi and is forced through the small orifice 104 and discharged therefrom as a spray of small liquid particles or mist that are directed to a desired location, such as the hair on a person's head.

Figures 16, 17:
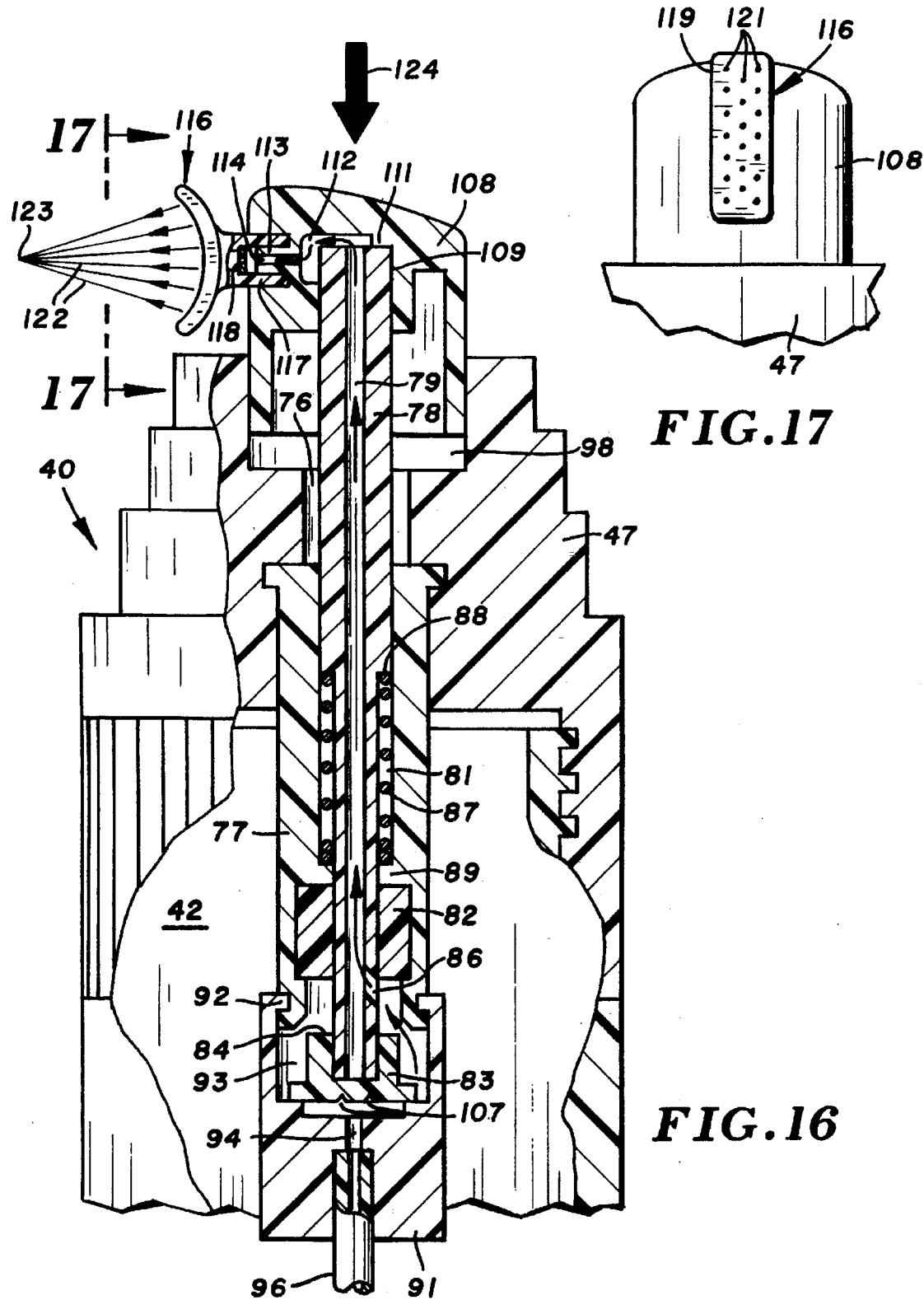
FIG. 16 is a sectional view similar to FIG. 13 showing a modification of the spray product discharge nozzle.
FIG. 17 is a front elevational view of the fluid discharge nozzle along the 17—17 of FIG. 16.
Figure 21:
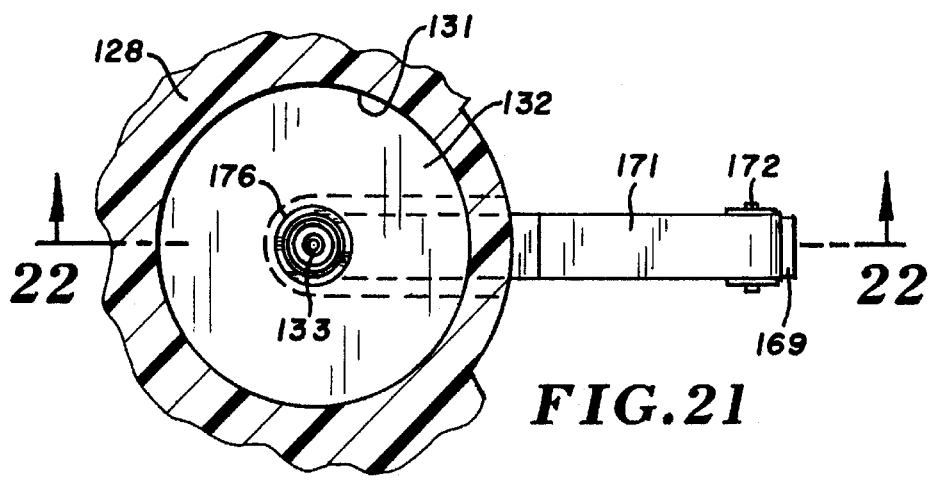
FIG. 21 is an enlarged sectional view taken along the line 21—21 of FIG. 20.

Referring to FIGS. 16 and 17, there is shown the liquid dispenser 40 equipped with a modified cap 108 for directing a plurality of streams of fine liquid particles to a common area 123. Cap 108 has an inside bore 109 accommodating the upper end of tubular member 78. The top of tubular member 78 engages a shoulder 111 and is open to a laterally directed passage 112 for delivering liquid under pressure to a nipple 113 having a small lateral passage 114. A nozzle, indicated generally at 116, is mounted on nipple 113. Nozzle 116 has a cylindrical member or collar 117 that is telescoped over nipple 113. Collar 117 supports an internal disc 118 having a small liquid discharge orifice leading to a concave head 119. Head 119 is a hollow arcuate structure that has an outside wall containing a plurality of rows of spaced holes 121, as seen in FIG. 17. The holes direct streams 122 of liquid to the common area 123, such as a hair wound around curlers. When button 108 is pressed in a downward direction, as indicated by arrow 124, hole 86 in tubular member 78 moves down from sleeve 82 to allow liquid under air pressure to flow through tube 96 into chamber 93, through hole 86 and passage 79 to passage 112 and through nozzle 116 to common area 123. The arcuate configuration of the outer face of nozzle 116 directs streams 122 of liquid to common area 123. When the force on button 108 is released, spring 87 moves tubular member 78 in an upward direction thereby positioning opening 86 adjacent sleeve 82 and the upper annular surface 87 of cup-shaped member 83 in engagement with the bottom of ring 82 thereby closing the valve and terminating the flow of liquid through passage 79 to nozzle 116.

Referring to FIGS. 18, 19 and 20, there is shown the apparatus, indicated generally at 126, for supplying air under pressure to dispenser 40. The only propellant in dispenser 40 is compressed air. Apparatus 126, as seen in FIG. 20, has a generally flat base 127 supporting an upwardly-curved cover 128. Cover 128 encloses an internal chamber 129 that has an air pump, indicated generally at 137, and the controls for the air pump. The front portion of front cover 128 has a downwardly-directed cylindrical wall forming a well 131 having a generally flat bottom wall 132. An upwardly-directed tapered tube 133 projects upwardly in the center portion of well 131. The lower end of tube 133 is secured to an elbow 134 connected to air pump 137 with a pipe 136. Elbow 134 is secured by welds or the like to bottom wall 132.

Air pump 137 has an elongated cylinder 138 mounted on a crank case 139. A head 141 is mounted on the end of cylinder 138 with a plurality of bolts 142. As seen in FIG. 20, the lower end of head 141 is supported on base 127 to stabilize the outer end of cylinder 138. Bolts 142 are threaded into the crank case 139 thereby holding cylinder 138 on crank case 139. Bolts 142 can be removed from crank case 139 so that a new cylinder having a different length can be mounted on crank case 139. As seen in FIG. 28, an annular seal 145 is between the end of cylinder 138 and head 141. Head 141 has a passage 143 that is open to pipe 136 for carrying air under pressure to the tapered tube 133.

Figure 29:
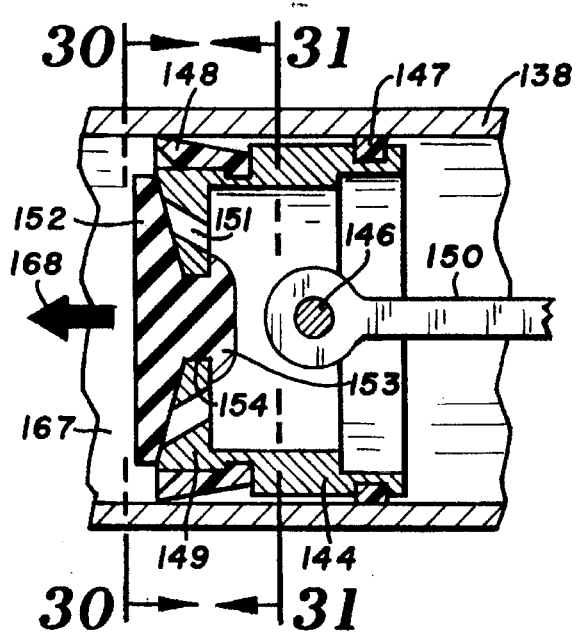
FIG. 29 is an enlarged sectional view taken along the 29—29 of FIG. 28.
Figure 31:
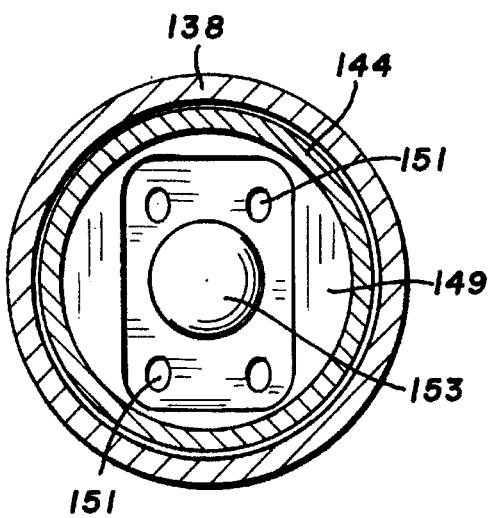
FIG. 31 is a sectional view taken along the line 31—31 of FIG. 29.
Figure 30:
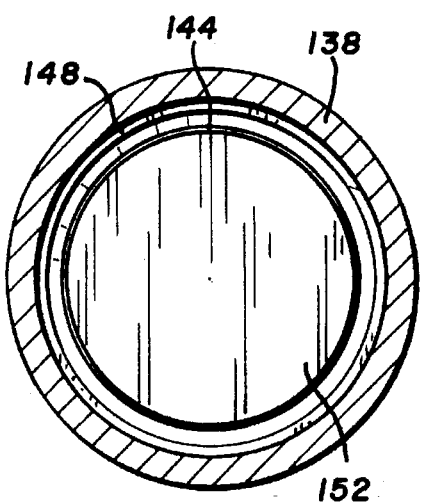
FIG. 30 is a sectional view taken along the line 30—30 of FIG. 29.
Figure 32:
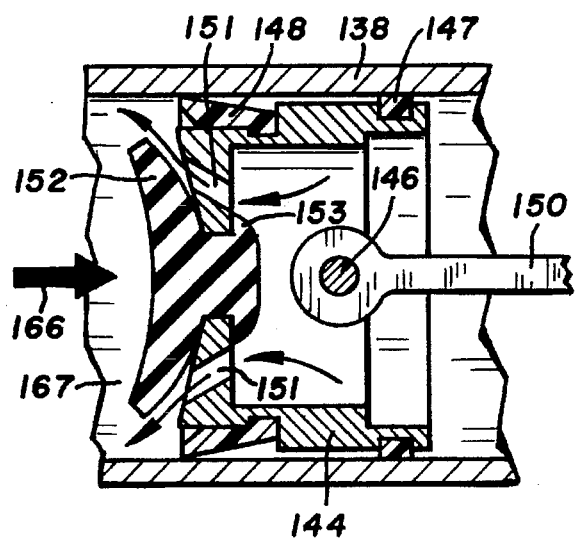
FIG. 32 is a sectional view similar to FIG. 29 showing the piston during movement of the intake stroke thereof.

A piston 144, as seen in FIG. 28, is slideably disposed within cylinder 138 and connected to a piston rod 150 with a wrist pin 146. Piston 144 has a front circular end 149 having a plurality of holes or passage 151 which are normally closed with the flexible annular flap valve 152. Valve 152 has a neck extended through a hole 154 in front wall 149 and an enlarged head or knob 153 holding the flap valve 152 in assembled relation with front wall 149. A pair of annular seals 147 and 148 are mounted on the outside perimeter of piston 144 to maintain sealing relationship between piston 144 and the inside annular wall of cylinder 148. As shown in FIGS. 29 and 32, seal 148 has an outwardly-directed annular lip located in sliding engagement with the inside wall of cylinder 138.

A power unit, shown as a dc electric motor 156, is connected to a transformer 156 and to a cord 158 leading to the conventional ac electric power. As shown in FIG. 28, electric motor 156 has a drive shaft 159 that is keyed to a crank wheel 161. Crank wheel 161 has a sector counter weight 162 opposite an outwardly-directed pin 163 connected to the outer end of connecting rod 150. Electric motor 156 operates to rotate crank wheel 161 and thereby reciprocate piston 144 relative to cylinder 138. As seen in FIG. 32, when piston 144 is moved in the direction of arrow 166, the flexible outer portions of flap valve 152 move outwardly to open holes 151. Air moves through piston 144 and holes 151 into the chamber 167. Referring to FIG. 29, when piston 144 is moved in a forward direction, as indicated by arrow 168, flap valve 152 moves to the closed position closing openings 151. The air in chamber 167 is compressed and forced through passage 143 and pipe 136 to the upright-tapered tube 133.

Figure 22:
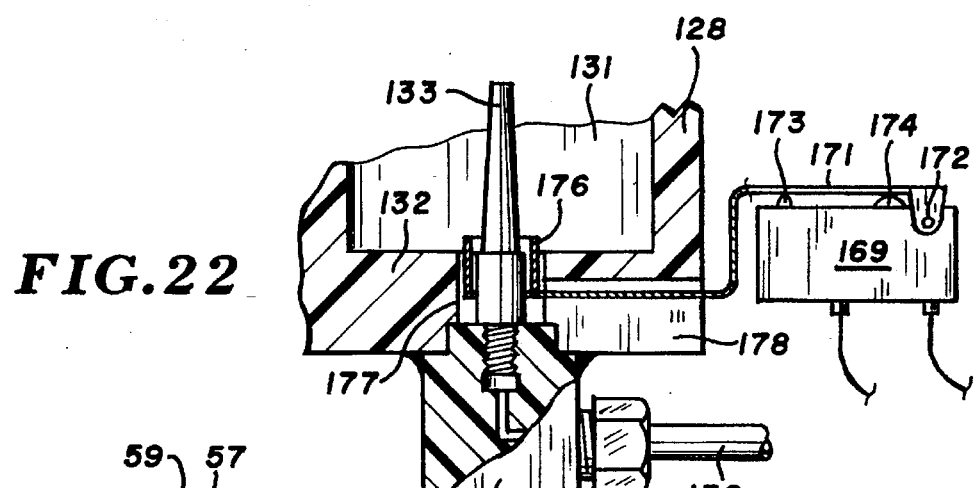
FIG. 22 is a sectional view taken along the line 22—22 of FIG. 21.
Figure 23:
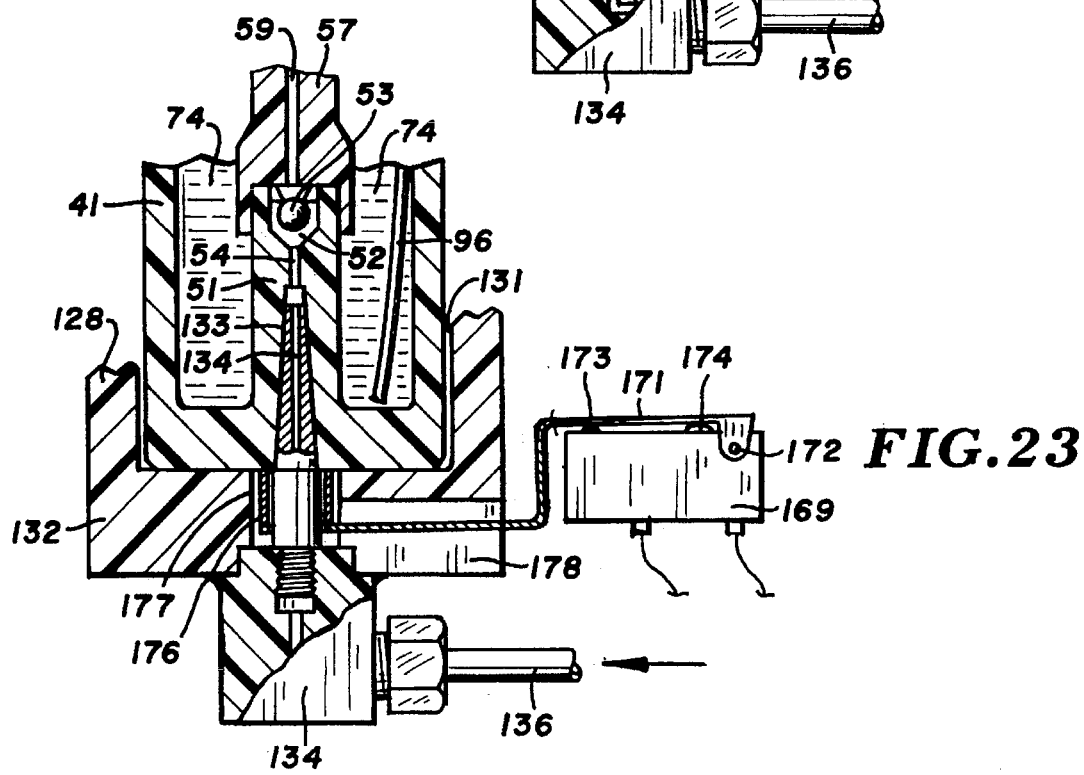
FIG. 23 is a sectional view similar to FIG. 22 showing the dispenser in the air receiving position on the air pump.

Electric motor 156 is controlled with a switch 169, as seen in FIGS. 20, 22 and 23. Switch 169 is a conventional micro switch having a switch actuator lever 171 pivoted at 172 and engageable with a movable actuator 173. A biasing member 174 is operable to hold lever 171 in an up position and the switch in an OFF condition. The free or outer end of lever 171 engages a cylindrical member or sleeve 176, located about the base of tapered tube 173, and in a hole 177 in the base or bottom wall 132 of pocket 131. Lever 171 extends through slot 178 in bottom wall 132 and supports sleeve 176 in a raised position. As seen in FIG. 22, an upper portion of sleeve 176 is located above the bottom wall of pocket 131.

As seen in FIG. 23, when container body 141 is placed in pocket 131, tapered tube 133 fits in the tapered hole in the bottom of container 41 in a tight sealed relation. The bottom wall engages sleeve 176 thereby moving lever 171 in a downward direction to turn switch 169 ON. This energizes electric motor 156 which in turn drives piston 144, thereby creating air under pressure which is delivered to passage 54 and past the check valve 53 and passage 159 for dispensing into chamber 42 of container body 41. The piston will continue to operate until a predetermined pressure, such as 100 psi, is attained in chamber 42. Other air pressures can be introduced into chamber 42 when the selected pressure of air chamber 42 has been attained and the air pressure fueled up in the pump chamber and causes the electric motor to stall. When container 41 is removed from recess 131, switch 169 returns to the normal OFF position terminating electric power to the electric motor 156. Motor 156 will not operate until switch 169 is turned ON.

In use, the cap 47 of the container is removed from the body 41. The spray product 74 is deposited into the chamber 42. Cap 47 is then turned onto the neck 46 of body 41 to seal chamber 42. The dispenser 40 is then charged with air under pressure with the air pump 126. The bottom portion of body 41 is placed in the recess 131. The upright tube 133 fits into the recess 44, as the side walls of the recess 131 guide the container to align the upright tube 133 with the tapered recess 44. When the bottom wall 43 of body 41 engages the collar 176, the actuator lever 171 is moved downwardly to turn switch 169 ON. This connects the source of electric power to the electric motor thereby operating the electric motor 156. Electric motor 156 rotates its drive shaft 159. As seen in FIG. 28, shaft 159 turns the eccentric member 161, thereby reciprocating piston 144 relative to cylinder 138. When the piston moves in its reverse direction, as shown by arrow 166 in FIG. 32, the air flows through the piston into the cylinder chamber 167. The flat valve 152 flexes in an outward direction opening the holes 151 to allow air to flow into the chamber 167. When piston 144 is moved in its forward direction, as indicated by arrow 168 in FIG. 29, the flap valve 152 returns to its closed position blocking the holes 151. The air in chamber 167 is compressed and forced through the passage 143 and tube 136 to the tubular member 133 which directs air into the passage 54 in the bottom of container 41. As seen in FIG. 23, the air flows through passage 54 and chamber 52, and opens the check valve 53. The air flows past check valve 53 through passage 59. As seen in FIG. 6, passage 59 leads to a short lateral passage 66 that is surrounded by the deformable collar 64. The air pressure in passage 66 is sufficient to deform collar 64 whereby the air flows into chamber 71 formed by cap 69. A small hole 73 allows the air to flow from chamber 79 into the container chamber 42 with a minimum of disturbance of the liquid 74 in chamber 42. This prevents the mixing of the air with the liquid and the foaming of the product in chamber 42.

The valve assembly mounted on cap 47 is normally in the closed position, as shown in FIG. 10. Collar 82, retained in sleeve 77 covers the lateral or side hole 86. The cup-shaped member 83 has an upper annular surface 84 located in sealing engagement with the bottom of collar 82 thereby preventing the flow of liquid in passage 79. When the actuator button 49 is moved in a down or open position, as shown in FIG. 13, the lateral hole 86 is located in communication with chamber 93. The air pressure in chamber 42 forces the liquid up the tube 96 and into the passage 79. The liquid flows out of passage 79 into the lateral passage 102 and through the small orifice 104 of disc 103 as fine streams of liquid particles that are directed to a location selected by the user of the dispenser. The streams of particles 105 are relatively fine and have a mist-like structure suitable for use in hair styling salons.

While there has been shown and described a preferred embodiment of the dispenser and air pump of the invention, and the combination thereof, it is understood that changes in the structures, arrangement of the structures and the materials may be made by those skilled in the art without departing from the invention. The invention is defined in the following claims.

We claim:

1. In combination, an apparatus for dispensing a spray product and air pump means for supplying air under pressure to the apparatus for dispensing a spray product, said apparatus having a container including bottom wall and a chamber for storing a spray product, said container having first means including a check valve to allow air to flow into the chamber of the container and block the flow of air out of the chamber of the container, said first means including a member joined to the bottom wall extended into the chamber of the container, said member having a first passage leading to the chamber of the container, said check valve being located in said first passage to allow air to flow through the first passage into the chamber of the container and prevent air from flowing through the passage out of the chamber of the container, said member has an upright extension having a second passage and an upper end, said second passage open to the first passage and having an exit opening at said upper end, a flexible collar surrounding the upper end of the extension closing said exit opening, cap means mounted on the extension and surrounding said collar, said cap means having an opening allowing air to flow into the chamber of the container, said container having second means operable to selectively allow the spray product to be dispensed as a particulate stream of product to selected location and prevent the dispensing of the product, said air pump means having means for supplying air under pressure, and means for receiving air from the air pump means cooperating with the first means for directing the air under pressure to open the check valve whereby air under pressure flows through the first and second passages into the chamber of the container subjecting the spray product therein to pressurized air.

2. The combination of claim 1 wherein: said bottom wall and member have a recess open to the passage, said means cooperating with the first means includes a tube extended into the recess for delivering air under pressure to said passage whereby air under pressure flows to said chamber of the container.

3. The combination of claim 1 wherein: the means for supplying air under pressure includes a pump for compressing air and an electric motor for operating the pump, switch means for connecting the electric motor to a source of electric power, said switch means having actuator means to turn the switch means ON when the first means of the container is cooperating with the first means for directing air under pressure to open the check valve to allow air to flow into the chamber of the container.

4. The combination of claim 1 wherein: the means for supplying air under pressure includes a pump for compressing air and an electric motor for operating the pump, switch means for connecting the motor to a source of electric power, said switch means having actuator means movable to turn the switch means ON thereby connecting the electric motor with the source of electric power whereby the electric motor operates the pump to compress air, said bottom wall of the container being engageable with the actuator means to move the actuator means to turn the switch means ON.

5. The combination of claim 2 wherein: said recess has cone-shaped side walls, and said tube has a converging taper corresponding to the shape of said side walls to provide an air seal between the side walls and tube.

6. The combination of claim 4 wherein: the air pump means includes a housing enclosing the pump, electric motor and actuator means, said housing having a recess for accommodating a lower portion of the container, said means cooperating with the first means includes a tube extended into said recess, said bottom wall of the container having a recess accommodating the tube, a collar surrounding the tube engageable with the actuator means and the bottom of the container whereby the container, when located in the recess of the housing, moves the actuator means to turn the switch means ON.

7. The combination of claim 4 wherein: said pump includes a cylinder having a chamber and a piston located in said chamber movable relative to the cylinder to compress air in the chamber, means driveably connecting the piston to the electric motor, said piston having at least one hole to allow air to flow into the cylinder chamber, and flap valve means mounted on the piston operable to selectively allow air to flow through said hole into the cylinder chamber and prevent air from flowing through said hole out of the cylinder chamber.

8. The combination of claim 7 wherein: the flap valve means is a flexible circular member and a central member connected to said piston.

9. The combination of claim 3 wherein: the air pump means includes a housing enclosing the pump, electric motor and actuator means, said housing having a recess for accommodating a lower portion of the container, said means cooperating with the first means includes a tube extended into said recess, said bottom wall of the container having a recess accommodating the tube, a collar surrounding the tube engageable with the actuator means and the bottom of the container whereby the container, when located in the recess of the housing, moves the actuator means to turn the switch means ON.

10. The combination of claim 3 wherein: said pump includes a cylinder having a chamber and a piston located in said chamber movable relative to the cylinder to compress air in the chamber, means driveably connecting the piston to the electric motor, said piston having at least one hole to allow air to flow into the cylinder chamber, and flap valve means mounted on the piston operable to selectively allow air to flow through said hole into the cylinder chamber and prevent air from flowing through said holes out of the cylinder chamber.

11. The combination of claim 10 wherein: the flap valve means is a flexible circular member and a central member connected to said piston.

12. An apparatus for dispensing a spray product to a selected location comprising: a container having a chamber for storing a spray product, said container having a body and a cap connected to the body, said body having a bottom wall, a tubular means having a passage extended from the bottom wall into the chamber for carrying air to the chamber, check valve means operatively associated with the tubular means to allow air to flow into the chamber and prevent air from flowing out of the chamber, means on said bottom wall having a passage open to the passage of the tubular means to accommodate means to supply air under pressure to said chamber, and valve assembly means mounted on the cap selectively operable to be moved to a first position to spray the product to a selected location and a second position to prevent the dispensing of the product, the valve assembly means includes a sleeve mounted on the cap, a tubular member having a lower end, an upper end, a passage extended from the lower end to the upper end, and a side port open to the passage for carrying a spray product, said tubular member being movably mounted on the sleeve for movement to a first position to allow the spray product to flow through said side port and passage, and to a second position to prevent the spray product from flowing through said passage and side port, a collar mounted on the sleeve surrounding and engageable with the tubular member, said side port being closed by said collar when the tubular member is in the second position, and said side port being spaced from the collar when the tubular member is in the first position to allow the spray product to flow through said side port and passage of the tubular member, said sleeve and tubular member having portions separated from each other providing annular space isolated from the spray product in the valve assembly, and biasing means located in the annular space engageable with the sleeve and tubular member to bias the tubular member from the first position to the second position, said biasing means being isolated from the spray product which flows through the passage of the tubular means.

13. The apparatus of claim 12 wherein: the tubular means has a first portion joined to the bottom wall and a second portion mounted on the first portion, said check valve means including a ball located between said first and second portions of the tubular means.

14. The apparatus of claim 12 wherein: the means on said bottom wall includes a member having a cone-shaped recess open to the passage of the tubular means.

15. The apparatus of claim 12 including: a member mounted on the lower end of the tubular member, said member having an annular surface engageable with the collar when the tubular member is in the second position.

16. The apparatus of claim 12 including: a body having a body chamber mounted on the inner end of the sleeve, and tube means connected to the body and extended into the chamber of the container adjacent the bottom wall for carrying the product to the body chamber, said tubular member and side port being moved into the body chamber when the tubular member is moved to the first position whereby the product flows through the body chamber, side port and passage in the tubular member.

17. The apparatus of claim 12 including: actuator means for the valve assembly mounted on the upper end of the tubular member, and nozzle means mounted on the actuator means to direct spray product to a selected location, said actuator means having a passage for carrying spray product from the tubular member to the nozzle means when in the tubular means has been moved to the first position.

18. The apparatus of claim 13 including: cap means mounted on the second portion of the tubular means, said cap means having at least one hole for directing air into the chamber.

19. The apparatus of claim 17 wherein: the nozzle means comprises a disc having a small orifice open to the passage in the actuator means.

20. An apparatus for dispensing a spray product to a selected location comprising: a container having a chamber for storing a spray product, said container having a body and a cap connected to the body, said body having a bottom wall, a tubular means having a passage extended from the bottom wall into the chamber for carrying air to the chamber, check valve means operatively associated with the tubular means to allow air to flow into the chamber and prevent air from flowing out of the chamber, means on said bottom wall having a passage open to the passage of the tubular means to accommodate means to supply air under pressure to said chamber, valve assembly means mounted on the cap selectively operable to be moved to a first position to the spray product to a selected position to prevent the dispensing of the product, the valve assembly means includes a sleeve mounted on the cap, a tubular member having a lower end, an upper end, a passage and a side port open to the passage for carrying a spray product movably mounted on the sleeve for movement to a first position to allow the spray product to flow through said passage and side port and to a second position to prevent the spray product from flowing through said passage and side port, a collar mounted on the sleeve surrounding and engageable with the tubular member, said side port being closed by said collar when the tubular member is in the second position, and said side port being spaced from the collar when the tubular member is in the first position to allow the spray product to flow through said side port and passage of the tubular member, actuator means for the valve assembly mounted on the upper end of the tubular member, and nozzle means mounted on the actuator means to direct spray product to a selected location, said actuator means having a passage for carrying spray product from the tubular member to the nozzle means when the tubular means has been moved to the first position, the nozzle means includes a head having a concave-shaped wall and a plurality of orifices in said concave-shaped wall open to the passage in the actuator means whereby when the tubular member has been moved to the first position, the spray product is discharged through said orifices to a selected location.

21. An apparatus for dispensing a spray product to a selected location comprising: a container having a chamber for storing a pressurized spray product and a top portion enclosing the spray product in the chamber, valve assembly means mounted on the top portion of the container operable to be moved to a first position to spray the product to a selected location and a second position to prevent the dispensing of the product, said valve assembly means includes a sleeve mounted on the top portion, a tubular member having a lower end, an upper end, a passage extended between the lower and upper ends, and a side port open to the passage for carrying a spray product, said tubular member being movably mounted on the sleeve for movement to a first position to allow the spray product to flow through said passage and side port and to a second position to prevent the spray product from flowing through said passage and side port, a collar mounted on the sleeve surrounding and engageable with the tubular member, said side port being closed by said collar when the tubular member is in the second position, and said side port being spaced from the collar when the tubular member is in the first position to allow the spray product to flow through said side port and passage of the tubular member, actuator means for the valve assembly mounted on the upper end of the tubular member, and nozzle means mounted on the actuator means to direct spray product to a selected location, said actuator means having a passage for carrying spray product from the tubular member to the nozzle means when the tubular means has been moved to the first position, the nozzle means includes a head having a concave-shaped wall and a plurality of orifices in said concave-shaped wall open to the passage in the actuator means whereby when the tubular member has been moved to the first position, the spray product is discharged through said orifices to a selected location.

22. The apparatus of claim 21 including: a member mounted on the lower end of the tubular member, said member having an annular surface engageable with the collar when the tubular member is in the second position.

23. The apparatus of claim 21 including: a body having a body chamber mounted on the inner end of the sleeve, and tube means connected to the body and extended into the chamber of the container adjacent the bottom wall for carrying the product to the body chamber, said tubular member and side port being moved into the body chamber when the tubular member is moved to the first position whereby the product flows through the body chamber, side port and passage in the tubular member.

24. The apparatus of claim 21 wherein: the valve assembly has biasing means between the sleeve and tubular member isolated from the spray product operable to bias the tubular member from the first position to the second position.

25. The apparatus of claim 21 including: actuator means for the valve assembly mounted on the upper end of the tubular member, and nozzle means mounted on the actuator means to direct spray product to a selected location, said actuator means having a passage for carrying spray product from the tubular member to the nozzle means when in the tubular means has been moved to the first position.

26. The apparatus of claim 21 wherein: said container includes means to allow air under pressure to be introduced into the chamber of the container and check valve means to permit air to flow into the chamber of the container and prevent air from flowing out of the chamber of the container.

27. The apparatus of claim 24 wherein: the sleeve has an annular space surrounding the tubular member separated from the passage and spray product, said biasing means comprising a spring located in said annular space operable to bias the annular member to the second position.

28. An apparatus for dispensing a spray product to a selected location comprising: a container having a chamber for storing a pressurized spray product and a top portion enclosing the spray product in the chamber, valve assembly means mounted on the top portion of the container operable to be moved to a first position to spray the product to a selected location and a second position to prevent the dispensing of the product, said valve assembly means includes a sleeve mounted on the top portion, a tubular member having a lower end, an upper end, a passage extended between the lower and upper ends, and a side port open to the passage for carrying a spray product, said tubular member being movably mounted on the sleeve for movement to a first position to allow the spray product to flow through said passage and side port, and to a second position to prevent the spray product from flowing through said side port and passage, a collar mounted on the sleeve surrounding and engageable with the tubular member, said side port being closed by said collar when the tubular member is in the second position, and said side port being spaced from the collar when the tubular member is in the first position to allow the spray product to flow through said side port and passage of the tubular member, said sleeve and tubular member having portions separated from each other providing an annular space isolated from the spray product in the valve assembly, and biasing means located in the annular space engageable with the sleeve and tubular means to bias the tubular member from the first position to the second position, said biasing means being isolated from the spray product which flows through the passage of the tubular means.

29. The apparatus of claim 28 including: a member mounted on the lower end of the tubular member, said member having an annular surface engageable with the collar when the tubular member is in the second position.

30. The apparatus of claim 28 including: a body having a body chamber mounted on the inner end of the sleeve, and tube means connected to the body and extended into the chamber of the container adjacent the bottom wall for carrying the product to the body chamber, said tubular member and side port being moved into the body chamber when the tubular member is moved to the first position whereby the product flows through the body chamber, side port and passage in the tubular member.

31. The apparatus of claim 28 wherein: said biasing means comprising a spring located in said annular space operable to bias the annular member to the second position.

32. The apparatus of claim 28 including: actuator means for the valve assembly mounted on the upper end of the tubular member, and nozzle means mounted on the actuator means to direct spray product to a selected location, said actuator means having a passage for carrying spray product from the tubular member to the nozzle means when in the tubular means has been moved to the first position.

33. The apparatus of claim 32 wherein: the nozzle means comprises a disc having a small orifice open to the passage in the actuator means.

34. The apparatus of claim 32 wherein: the nozzle means includes a head having a concave-shaped wall and a plurality of orifices in said concave-shaped wall open to the passage in the actuator means whereby when the tubular member has been moved to the first position, the spray product is discharged through said orifices to a selected location.

35. An apparatus for dispensing a spray product to a selected location comprising: a container having a chamber for storing a pressurized spray product, valve assembly mounted on the container operable to be moved to a first position to spray the product to a selected location and a second position to prevent the dispensing of the product, actuator means connected to the valve assembly, used by a person to move the valve assembly to the first position, and nozzle means mounted on the actuator means to direct spray product to a selected location, said actuator means having a passage for carrying spray product from the valve assembly to the nozzle means when the valve assembly has been moved to the first position, the nozzle means includes a head having a wall and at least one orifice in said wall open to the passage in the actuator means whereby when the valve assembly has been moved to the first position, the spray product is discharged through said at least one orifice to a selected location, the valve assembly has a sleeve and a tubular member slideably mounted in said sleeve, said actuator being mounted on the tubular member, said tubular member having a passage for carrying the spray product from the container chamber to the actuator means, seal means for controlling the flow of spray product into the passage, said sleeve and tubular member having portions separated from each other producing an annular space isolated from the spray product in the valve assembly, biasing means located in the annular space for biasing the valve assembly to the second position, said biasing means being isolated from the spray product which flows through the passage of the tubular means.

* * * * *